(12) United States Patent
Catchpole et al.

(10) Patent No.: US 8,580,116 B2
(45) Date of Patent: Nov. 12, 2013

(54) NEAR-CRITICAL FLUID EXTRACTION PROCESS

(75) Inventors: Owen John Catchpole, Wellington (NZ); John Bertram Grey, Wellington (NZ); Nicola Emma Durling, Lower Hutt (NZ); Kameron Gary Dunn, Queensland (AU)

(73) Assignee: Industrial Research Limited, Lower Hutt (NZ)

( * ) Notice: Subject to any disclaimer, the term of this patent is extended or adjusted under 35 U.S.C. 154(b) by 1085 days.

(21) Appl. No.: 12/278,554

(22) PCT Filed: Feb. 1, 2007

(86) PCT No.: PCT/NZ2007/000024
§ 371 (c)(1),
(2), (4) Date: Jun. 25, 2009

(87) PCT Pub. No.: WO2007/091901
PCT Pub. Date: Aug. 16, 2007

(65) Prior Publication Data
US 2010/0151098 A1    Jun. 17, 2010

(30) Foreign Application Priority Data
Feb. 7, 2006    (NZ) ........................................ 545146

(51) Int. Cl.
B01D 11/04    (2006.01)
B01D 17/00    (2006.01)

(52) U.S. Cl.
USPC ............ 210/634; 210/643; 210/648; 426/425

(58) Field of Classification Search
None
See application file for complete search history.

(56) References Cited

U.S. PATENT DOCUMENTS

| 3,795,750 A | 3/1974 | Levine ........................... 426/332 |
| 3,900,288 A | 8/1975 | Levine .............................. 21/58 |
| 4,048,343 A | 9/1977 | Levine ........................ 426/330.2 |
| 4,069,351 A | 1/1978 | Yano et al. ..................... 426/650 |
| 4,136,065 A | 1/1979 | Yano et al. ..................... 252/522 |

(Continued)

FOREIGN PATENT DOCUMENTS

| EP | 1122259 A2 | 8/2001 |
| FR | 2 799 984 A1 | 4/2001 |

(Continued)

OTHER PUBLICATIONS

Annotated machine translation of FR2799984, generated Sep. 10, 2012.*

(Continued)

*Primary Examiner* — Katherine Zalasky
(74) *Attorney, Agent, or Firm* — Seed IP Law Group PLLC

(57) ABSTRACT

A process for fractionating the constituents of a solution obtained by extracting plant or animal material with an aqueous-organic solvent where the aqueous-organic solvent is a mixture of water and a water-miscible organic solvent, generally including the steps of contacting the solution with a near-critical fluid to produce a raffinate phase containing high polarity constituents and water, and a near-critical fluid phase containing low to medium polarity constituents, separating the near-critical fluid phase from the raffinate phase, and recovering the low to medium polarity constituents from the near-critical fluid phase and the high polarity constituents from the raffinate phase.

44 Claims, 2 Drawing Sheets

(56) References Cited

U.S. PATENT DOCUMENTS

| | | | |
|---|---|---|---|
| 4,157,404 A | 6/1979 | Yano et al. | 426/429 |
| 4,234,619 A | 11/1980 | Yano et al. | 426/614 |
| 4,375,387 A | 3/1983 | deFilippi et al. | 202/169 |
| 4,632,837 A | 12/1986 | Schütz et al. | 426/425 |
| 4,867,997 A | 9/1989 | Wiesenberger et al. | 426/387 |
| 4,964,995 A | 10/1990 | Chum et al. | 210/634 |
| 5,017,397 A | 5/1991 | Nguyen et al. | 426/542 |
| 5,252,729 A | 10/1993 | De Crosta et al. | 540/18 |
| 5,349,084 A | 9/1994 | Shishikura et al. | 562/580 |
| 5,360,478 A | 11/1994 | Krukonis et al. | 117/68 |
| 6,291,241 B1 | 9/2001 | Castor et al. | 435/410 |
| 6,326,504 B1 | 12/2001 | Piquer et al. | 554/11 |
| 6,569,640 B1 | 5/2003 | Castor et al. | |
| 7,329,789 B1 * | 2/2008 | Schonemann et al. | 585/351 |
| 2004/0014084 A1 | 1/2004 | Krukonis et al. | 435/6 |
| 2006/0035350 A1 * | 2/2006 | Catchpole et al. | 435/134 |

FOREIGN PATENT DOCUMENTS

| | | | |
|---|---|---|---|
| JP | 61-210043 A | | 9/1986 |
| JP | 61-221299 A | | 10/1986 |
| JP | 2-235997 A | | 9/1990 |
| JP | 4-141204 A | | 5/1992 |
| JP | 4-246500 A | | 9/1992 |
| JP | 6-48952 A | | 2/1994 |
| JP | 2001-106636 A | | 4/2001 |
| WO | WO 90/03782 A2 | | 4/1990 |
| WO | WO 03/089399 | * | 10/2003 |
| WO | WO 2004/066744 A1 | | 8/2004 |
| WO | 2005075614 A1 | | 8/2005 |

OTHER PUBLICATIONS

Catchpole et al., "Supercritical antisolvent fractionation of propolis tincture," *J. of Supercritical Fluids* 29:97-106, 2004.

Perry et al., "Alkamide Levels in *Echinacea purpurea*: A Rapid Analytical Method Revealing Differences among Roots, Rhizomes, Stems, Leaves and Flowers," *Planta Medica* 63:58-62, 1997.

Perry et al., "*Echinacea* Standardization: Analytical Methods for Phenolic Compounds and Typical Levels in Medicinal Species," *J. Agric. Food Chem.* 49:1702-1706, 2001.

* cited by examiner

NEAR-CRITICAL FLUID EXTRACTION PROCESS

TECHNICAL FIELD

This invention relates to separation technology. A process is provided whereby the constituents of a solution obtained by extracting plant or animal material with an aqueous-organic solvent mixture is separated into fractions based on polarity by contacting the solution with a near-critical fluid. The invention also particularly relates to a two step process where the solution is firstly contacted with near-critical carbon dioxide to obtain a raffinate phase and then contacting that raffinate phase with near-critical dimethyl ether.

BACKGROUND

There is widespread use of extracts of plants, and tinctures (extracts of plants dissolved in an organic solvent, usually ethanol) of plants as natural health remedies. Extracts of plants are particularly desirable, for example, as the quantity to be ingested is decreased relative to using fresh plant material, and also the storage life is improved relative to the plant material. There is a desire to standardize the strength of the plant extracts against "marker compounds" with known or suspected bioactivity. The solvents most widely used to extract these plant materials are water and water+ethanol mixtures and to a lesser extent, water with other hydrophilic organic solvents, such as acetone and acetic acid. These solvent mixtures have high solvent strength but low selectivity, resulting in the extraction of all the desired physiologically active components and also a large amount of inactive or even undesirable components. There exists a need, therefore, for a separation process that can further fractionate the crude extracts obtained from plants using aqueous-organic solvent mixtures, to be able to increase the concentration of the desired bioactive or marker compounds and reduce or remove inactive and/or undesirable components.

The most common solvents for extracting plant materials to obtain biologically active extracts are mixtures of water and ethanol. The proportions can vary from 0 to 100% of each solvent component. These solvent mixtures are widely used, as they require relatively simple technology to perform extractions from plant material, and are acceptable for food grade processes. Other alcohols, such as isopropanol and propanol can be substituted for ethanol but the allowable concentrations in the final product are diminished relative to ethanol. The aqueous-organic solvent mixtures are not limited to water and ethanol mixtures. Numerous other hydrophilic organic solvents, such as acetone, acetic acid, dimethylsulfoxide and methanol may also be used.

Near-critical or supercritical $CO_2$ is an alternative food-grade solvent possibility for the extraction of biologically active compounds because its critical temperature and pressure (31° C., 74 bar) is attained relatively easily and, furthermore, $CO_2$ is inert, non-toxic, cheap and readily available. It is well known in the art that $CO_2$ is a substantially weaker solvent than ethanol. The range of extractable physiologically active compounds using supercritical $CO_2$ is limited in general to lipophilic (fat soluble), low to medium molecular mass molecules, such as flavour and fragrance compounds as described in U.S. Pat. No. 4,632,837. Attempts to improve the solvent power have been described in, for example, U.S. Pat. No. 5,017,397 where pressures greater than 350 bar have been used, and U.S. Pat. No. 5,252,729 where plant material and $CO_2$ insoluble molecules have been hydrolysed to break the molecules into extractable fragments.

The extraction of natural products from plant materials using a single phase mixture of $CO_2$ and an organic solvent, known as a co-solvent, has been attempted to try and overcome the limitations of pure $CO_2$. The co-solvent is usually used in a proportion of 5 to 20% by mass. Examples of patents that describe the use of $CO_2$ and a co-solvent for the extraction of physiologically active compounds from plants include U.S. Pat. No. 5,252,729 (referred to above), U.S. Pat. No. 6,569,640, and U.S. Pat. No. 6,291,241. In addition, U.S. Pat. No. 6,326,504 describes a method for extracting plant material using an organic solvent with a near-critical fluid dissolved in it, where the near-critical fluid is less than 50%, and preferably between 7 to 26%, by weight of the total solvent mixture. Extraction is carried out at a pressure of 50-500 bar, and preferably 150-280 bar. The purported advantages are a reduction in viscosity and increase in diffusivity of the solvent mixture. A reduction in the solvent power of the mixture relative to the pure organic solvent is not noted, but is known in the art as described below. All of the aforementioned processes require the use of high pressure in the initial extraction of the plant material, which in turn requires large extraction vessel volumes. This gives rise to high capital costs of processing plant.

An alternative near-critical fluid to $CO_2$ is dimethyl ether. Dimethyl ether with and without water has also been used to extract plant and animal materials, as described in U.S. Pat. No. 4,234,619, U.S. Pat. No. 4,157,404, U.S. Pat. No. 4,136,065, U.S. Pat. No. 4,069,351, U.S. Pat. No. 4,048,343, U.S. Pat. No. 3,900,288, U.S. Pat. No. 3,795,750, and JP 2001106636. However, none of the aforementioned patents describes a method for the extraction and fractionation of extracts of plants or animal products contained within an aqueous-organic solvent solution. Much lower pressures can be used to extract a wider variety of compounds with dimethyl ether compared to supercritical $CO_2$, and drying of the plant material may not be required. However, large pressurized extractors are still required, along with large volumes of dimethyl ether, which can be a safety hazard. The range of compounds that can be extracted is also substantially less than aqueous-organic solvents.

The poor solvent properties of $CO_2$ with respect to polar and/or large molecules can be used to produce fine powders. The $CO_2$ GAS (Gas Anti-Solvent) precipitation process was first described in U.S. Pat. No. 5,360,478. A solid material can be recrystallised from systems comprising:
(i) a solute, which is the eventual material recrystallised;
(ii) a liquid, which is a suitable solvent for the solute; and
(iii) a gaseous component ($CO_2$), which is soluble in the solvent and causes the solvent to approach or attain a supersaturated state, thereby precipitating the solute material.

A variation on the GAS process is the SAS (Supercritical Anti-Solvent) or PCA (Precipitation with a Compressed Anti-Solvent). Here, the organic solvent solution containing the solute to be recrystallised is mixed with a supercritical fluid under conditions where the solvent is completely miscible with the fluid, but the solute is insoluble in the new solvent mixture (WO 9003782). The solute precipitates to form a fine powder.

U.S. Pat. No. 5,349,084 describes a process for the purification of dicarboxylic acids using GAS fractionation following the production of crude acids in a fermentation process, extraction of the acids from the fermentation broth with hot water, reduction of the water content in the crude acid/water mixture to 3-30%, followed by re-extraction of the acids with an organic solvent. $CO_2$ is used as an anti-solvent to precipitate unwanted compounds from solution. The pressure of the anti-solvent is below the critical point for $CO_2$.

JP 6048952 describes a multi-step process where plant material is extracted with an organic solvent (usually ethanol) to yield a solution containing a fat soluble physiologically active component. The solution is mixed with a high pressure gas ($CO_2$) under conditions where the gas dissolves to a large extent in the liquid solvent to precipitate polar compounds and/or a polar liquid fraction. The organic solution containing dissolved $CO_2$ is then compressed to a pressure of 100-500 bar and mixed with further (supercritical) $CO_2$ at the same pressure to dissolve further $CO_2$ into the organic solvent to further reduce the solvent power of the organic solvent. The resultant solution is then passed into a column. The medium polarity component is precipitated into the base of the column, and the low polarity component remains dissolved in the new solution of organic solvent and $CO_2$. This solution then passes through a pressure reduction valve and into a separator where the $CO_2$ is separated from the organic solvent and low polarity component. The $CO_2$ then passes through a further separator, under conditions where $CO_2$ is a gas, to remove contaminants.

However, the process of JP 6048952 suffers from a number of disadvantages. The first disadvantage is that the first separation step results in a gas saturated organic solution that must be pumped to a higher pressure. This results in cavitation in the pump due to the release of gas. The second disadvantage is that $CO_2$ gas has very poor solubility in aqueous-organic solutions, even at high pressures (the document states that an aqueous-ethanol solution may be used in the process, although no example is provided). The process is therefore limited to low water levels when the solvent is aqueous-organic. The third disadvantage is that recycling $CO_2$ requires a gas compressor, due to the low pressure requirements for the first separation stage. The use of a gas compressor requires more energy than a pump.

A supercritical anti-solvent process for the fractionation of propolis tinctures is disclosed in O J Catchpole, J B Grey, K A Mitchell, J S Lan, J. Supercritical Fluids, 29, 97-106, 2004. Bees collect a resinous exudate from the leaves of some species of trees, and then mix this with beeswax to obtain propolis, which is then used to provide protection for the hive. Propolis is a complex resinous mixture of components including waxes, flavonoids, and detritus from the hive. The propolis is scraped from the hive, and a tincture is made by dissolving the propolis in ethanol or an ethanol and water mixture. This tincture is then further processed to remove waxes and detritus. The process described identifies conditions under which aglycone flavonoids (flavonoids without attached carbohydrate groups) can be extracted from the tincture using supercritical $CO_2$ and other unidentified components can be precipitated. The process is efficient at recovering aglycone flavonoids from tinctures made using 95% ethanol, but the efficiency is decreased markedly when the ethanol content of the ethanol-water mixture is decreased to 70%, and water increased to 30%. There is no description of a process for the fractionation of plant or animal material that has been directly extracted with an aqueous-organic solution, nor a process for isolating chemical compounds other than aglycone flavonoids. Aglycone flavonoids are not normally found in hydroalcoholic extracts of leaf material, but much more polar glycosylated flavonoids can be found.

WO 2005/075614 describes a process for the extraction of olive leaf, followed by fractionation of the extract. Here the olive leaf is extracted either with hexane or ethanol, and then the crude extract has the majority of the solvent removed by vacuum fractionation and is filtered or clarified to remove precipitates. Hexane extracts only low polar compounds, while ethanol extracts low to medium polarity compounds from the leaf. The concentrated extract is then contacted with supercritical $CO_2$ in a countercurrent packed column. A second, more polar organic solvent, up to a concentration of 10%, is added to the supercritical $CO_2$ to improve the solubility of low to medium polarity compounds. The $CO_2$ and organic co-solvent extracts all the remaining solvent and the low to medium polarity compounds in the extract, which can be recovered by two stage pressure reduction. Highly polar compounds are precipitated inside the column when using ethanol. The method for recovering these compounds is not described. A precipitate fraction is not obtained when using hexane as the primary extraction solvent. There is no description of a process in which the plant material is extracted with an aqueous-organic solvent mixture containing more than 5% water, nor a process in which the aqueous-organic mixture is contacted directly with the near-critical fluid (the solvent mixture is first partially evaporated).

The process described in WO 2005/075614 has several disadvantages. Firstly, the crude extract must be partially evaporated and filtered/clarified. This requires high energy costs to remove and recover the solvent, and requires more processing steps and process equipment. The most polar compounds are not extracted in the solvent extraction step because an aqueous-organic solvent has not been used. The highest polarity compounds that have been extracted are precipitated inside the column and can only be removed in a discontinuous manner by removing $CO_2$ from the column, and then cleaning the column with an organic solvent. A further disadvantage is that a second organic solvent is required as a co-solvent to increase the solvent power of $CO_2$ for low to medium polarity compounds.

The inventor has now made the surprising finding that a process for fractionating the constituents of a solution (obtained by extracting plant or animal material with an aqueous-organic solvent) by contacting the solution with a near-critical fluid followed by further processing overcomes or ameliorates one or more disadvantages of known processes.

It is therefore an object of the invention to provide a process for fractionating the constituents of a solution of components extracted from plant or animal material, or at least to provide a useful alternative process.

STATEMENTS OF INVENTION

In a first aspect of the invention there is provided a process for fractionating the constituents of a solution obtained by extracting plant or animal material with an aqueous-organic solvent where the aqueous-organic solvent is a mixture of water and a water-miscible organic solvent, including the steps:
(a) contacting the solution with a near-critical fluid to produce a raffinate phase containing high polarity constituents and water, and a near-critical fluid phase containing low to medium polarity constituents;
(b) separating the near-critical fluid phase from the raffinate phase; and
(c) recovering the low to medium polarity constituents from the near-critical fluid phase.

Preferably the process further includes the step of recovering the high polarity constituents from the raffinate phase.

In a second related aspect of the invention there is also provided a process for fractionating the constituents of a solution obtained by extracting plant or animal material with an aqueous-organic solvent where the aqueous-organic solvent is a mixture of water and a water-miscible organic solvent, including the steps:
(a) contacting the solution with a near-critical fluid to produce a first raffinate phase containing high polarity constituents and water, and a first near-critical fluid phase containing low to medium polarity constituents;
(b) separating the first near-critical fluid phase from the first raffinate phase;
(c) contacting the first near-critical fluid phase with a second raffinate phase to produce a third raffinate phase containing medium polarity constituents and a second near-critical fluid phase containing low to medium polarity constituents;
(d) separating the second near-critical fluid phase from the third raffinate phase; and
(e) recovering the low to medium polarity constituents from the second near-critical fluid phase.

It is preferred that the near-critical fluid is selected from the group consisting of supercritical $CO_2$, liquid $CO_2$, ethane, ethylene, propane, propylene, butane, fluorinated $C_2$-$C_3$ hydrocarbons, nitrous oxide, sulfur hexafluoride, dimethylether, partially and fully fluorinated analogues of dimethylether, and mixtures of any two or more thereof.

The near-critical fluid will typically be selected from the group consisting of supercritical $CO_2$, liquid $CO_2$, and dimethylether, and in most cases will be either supercritical $CO_2$ or liquid $CO_2$. Alternatively, the near-critical fluid may preferably be dimethylether.

Preferably the water-miscible organic solvent is a $C_1$-$C_4$ alcohol, for example ethanol.

The aqueous-organic solvent will preferably contain between 50% and 99% ethanol (by volume) when the near-critical fluid is supercritical $CO_2$, more preferably between 70 and 99% ethanol (by volume).

When the near-critical fluid is dimethyl ether, the aqueous-organic solvent preferably contains between 0 and 70% ethanol (by volume), more preferably between 0 and 50% ethanol (by volume).

In other preferred embodiments of the invention, the water-miscible organic solvent is selected from the group consisting of a $C_3$-$C_5$ ketone, a $C_1$-$C_4$ carboxylic acid, and dimethylsulfoxide.

It is preferred that the low to medium polarity constituents are recovered from the near-critical fluid phase, or the second near-critical fluid phase, by reducing the pressure and/or temperature of the near-critical fluid phase. Preferably the pressure is reduced in two or more steps to recover the low to medium polarity constituents in two or more fractions.

The process may alternatively be carried out as a continuous process of removal of the raffinate phase and the near-critical fluid phase, or the second near-critical phase, without reducing the pressure.

In a third aspect of the invention there is provided a process for fractionating the constituents of a solution obtained by extracting plant or animal material with an aqueous-organic solvent where the aqueous-organic solvent is a mixture of water and a water-miscible organic solvent, including the steps:
(a) contacting the solution with a first near-critical fluid to produce a first raffinate phase containing high polarity constituents and water, and a first near-critical fluid phase;
(b) separating the first near-critical fluid phase from the first raffinate phase;
(c) contacting the first raffinate phase with a second near-critical fluid to produce a second raffinate phase containing high polarity constituents and water, and a second near-critical fluid phase containing medium polarity constituents;
(d) separating the second near-critical fluid phase from the second raffinate phase; and
(e) recovering the medium polarity constituents from the second near-critical fluid phase.

It is preferred that the first and second near-critical fluids are independently selected from the group consisting of supercritical $CO_2$, liquid $CO_2$, ethane, ethylene, propane, propylene, butane, fluorinated $C_2$-$C_3$ hydrocarbons, nitrous oxide, sulfur hexafluoride, dimethylether, partially and fully fluorinated analogues of dimethylether, and mixtures of any two or more thereof.

Preferably, the first near-critical fluid has a lower solvent power for polar compounds than the second near-critical fluid.

More preferably, the first near-critical fluid is liquid or supercritical $CO_2$, and the second near-critical fluid is liquid dimethyl ether.

In a fourth aspect of the invention there is provided a process for fractionating the constituents of a solution obtained by extracting plant or animal material with an aqueous-organic solvent where the aqueous-organic solvent is a mixture of water and a water-miscible organic solvent, including the steps:
(a) contacting the solution with a first near-critical fluid to produce a first raffinate phase containing high polarity constituents and water, and a first near-critical fluid phase;
(b) separating the first near-critical fluid phase from the first raffinate phase;
(c) contacting the first raffinate phase with a second near-critical fluid to produce a second raffinate phase containing high polarity constituents and water, and a second near-critical fluid phase containing medium polarity constituents;
(d) separating the second near-critical fluid phase from the second raffinate phase;
(e) contacting the second near-critical fluid phase with a third raffinate phase to produce a fourth raffinate phase containing medium polarity constituents and a third near-critical fluid phase containing other medium polarity constituents;
(f) separating the third near-critical fluid phase from the fourth raffinate phase; and
(g) recovering the other medium polarity constituents from the third near-critical fluid phase.

It is preferred that the first and second near-critical fluids are independently selected from the group consisting of supercritical $CO_2$, liquid $CO_2$, ethane, ethylene, propane, propylene, butane, fluorinated $C_2$-$C_3$ hydrocarbons, nitrous oxide, sulfur hexafluoride, dimethylether, partially and fully fluorinated analogues of dimethylether, and mixtures of any two or more thereof.

Preferably, the first near-critical fluid has a lower solvent power for polar compounds than the second near-critical fluid.

More preferably, the first near-critical fluid is liquid or supercritical $CO_2$, and the second near-critical fluid is liquid dimethyl ether.

In a fifth aspect of the invention there is provided a process for fractionating the constituents of a solution obtained by extracting plant or animal material with an aqueous-organic solvent where the aqueous-organic solvent is a mixture of water and a water-miscible organic solvent, including the steps:
(a) contacting the solution with a first near-critical fluid to produce a first raffinate phase containing high polarity constituents and water, and a first near-critical fluid phase containing low to medium polarity constituents;
(b) separating the first near-critical fluid phase from the first raffinate phase;
(c) recovering the low to medium polarity constituents and organic solvent from the first near-critical fluid phase to give a second solution;
(d) contacting the second solution with a second near-critical fluid to produce a second raffinate phase containing medium polarity constituents;
(e) separating the second near-critical fluid phase from the second raffinate phase;
(f) recovering the medium polarity constituents from the second raffinate phase; and
(g) recovering the low polarity constituents from the second near-critical fluid phase.

It is preferred that the first and second near-critical fluids are independently selected from the group consisting of supercritical $CO_2$, liquid $CO_2$, ethane, ethylene, propane, propylene, butane, fluorinated $C_2$-$C_3$ hydrocarbons, nitrous oxide, sulfur hexafluoride, dimethylether, partially and fully fluorinated analogues of dimethylether, and mixtures of any two or more thereof.

Preferably, the first near-critical fluid has a higher solvent power for polar compounds than the second near-critical fluid.

More preferably, the first near-critical fluid is liquid dimethyl ether, and the second near-critical fluid is liquid or supercritical $CO_2$.

DETAILED DESCRIPTION

Figure 1:
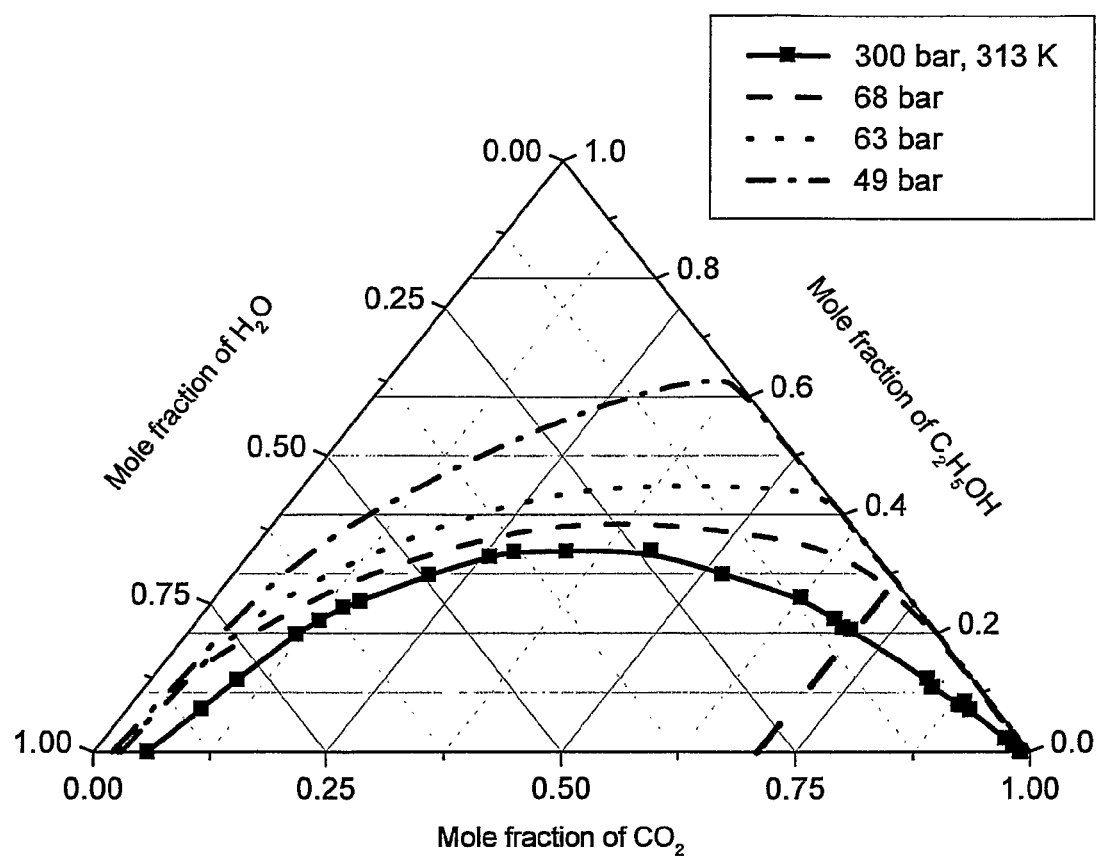
FIG. 1 shows a ternary phase diagram for three pressures at 308 K, and 300 bar at 313 K, for the system ethanol-water-$CO_2$.

The invention relates to a near-critical anti-solvent fractionation process to produce fractions from aqueous-organic solvent extractions of plant materials. In this process the near-critical fluid acts simultaneously as a solvent and an anti-solvent to produce at least two fractions: at least one extract fraction containing low to medium polarity compounds and at least one fraction containing high polarity compounds and water. The process can be reapplied to either of these fractions using a second near-critical fluid.

The invention is broadly directed to the extraction of plant or animal raw materials with an aqueous-organic solvent to obtain a solution containing an extract with a plurality of compounds, followed by separation of the extract into fractions based on their polarity by contacting the solution with a near-critical fluid. The near-critical fluid acts as both a solvent and an anti-solvent The term "high polarity" as used herein generally refers to compounds that are more soluble in ethanol/water mixtures than in pure ethanol The term "low polarity" as used herein generally refers to compounds that are soluble in fats or oils and typical fat or oil solvents and have moderate to poor solubility in ethanol (and are insoluble in water)

The term "medium polarity" as used herein generally refers to compounds that are soluble in ethanol but poorly or insoluble in water The term "aqueous-organic solvent" as used herein generally means a solvent mixture containing water and a low molecular weight water-miscible organic solvent, such as C1-C3 alcohols, acetone, C1-C3 carboxylic acids, dimethylsulfoxide, C1-C4 alkyl amines, aryl amines, C2-C4 aldehydes, and pyridine. It will be understood by those skilled in the art that the organic solvent is a water-miscible organic solvent, and that the organic solvent will be highly soluble, or miscible with supercritical $CO_2$ or near-critical dimethyl ether at suitable pressures and temperatures known to those skilled in the art.

The term "contact" as used herein generally means admixing the solution with the near-critical fluid in suitable apparatus connected to or contained within an extraction vessel/precipitation chamber as are well known in the art. Suitable apparatus includes, but is not limited to, a static mixer, a nozzle, a mixing valve, packing (structured or random), a tee-joint, a membrane contactor, and concentric pipes. Preferably, the solution and near-critical fluid are contacted using a static mixer.

The term "solvent power" as used herein generally refers to the ability of a solvent to dissolve solutes. For example, a fluid that has a high solvent power for polar compounds means that the fluid has a greater ability to dissolve polar compounds than a fluid that has a low solvent power for polar compounds.

The term "separate" as used herein generally means removing the stream comprising the near-critical fluid phase and the dissolved low to medium polarity compounds from the apparatus, while excluding the precipitated polar compounds from the stream.

The term "near-critical fluid" as used herein means a fluid that is close to its critical point and thus includes both subcritical and supercritical fluids. Near-critical includes the reduced temperature range $0.70 \leq T_r \leq 1.25$ (where $T_r$ is the temperature divided by the critical temperature, $T_c$ of the fluid); and the pressure ranges $P > P_v$ (where $P_v$ is the vapour pressure) for $T < T_c$ and $P > P_c$ (where $P_c$ is the critical pressure) for $T \geq T_c$.

Preferably, the near-critical fluid used is supercritical $CO_2$, subcritical dimethyl ether, or mixtures thereof. Supercritical $CO_2$ may be admixed with the solution at a desired pressure ($\geq 75$ bar) and desired temperature, T ($>31.2°$ C.). Alternatively, liquid $CO_2$ can be used (T<$31.2°$ C., pressure greater than the vapour pressure of $CO_2$ at T); or near-critical dimethyl ether at a pressure greater than its vapour pressure at given temperature, where that temperature is between 10° C. and 100° C. The near-critical region is taken to include the region where the vapour pressure of the solvent is at least 5 bar at room temperature (298 K). Other near critical fluids known in the art can be used such as ethane, ethylene, propane, propylene, butane, fluorinated C2-C3 hydrocarbons (particularly R134a-1,1,1,2-tetrafluoroethane), nitrous oxide, sulfur hexafluoride, partially to fully fluorinated analogues of dimethylether, and any mixtures thereof. However, all these solvents, with the exception of dimethyl ether, have poor mutual solubility with water, and thus dimethyl ether is the preferred solvent when the aqueous-organic solvent is between 50% and 100% water (on an extract free basis).

Preferably, the temperature is in the range 273-343 K, and the pressure is sufficient to ensure complete extraction of the low to medium polarity compounds, and precipitation of the highly polar compounds. Those skilled in the art will appreciate that the temperature and pressure are selected to enable the organic solvent to be substantially soluble in the near-critical fluid.

Suitable low to medium polarity compounds are those which are soluble in the near-critical fluid, or are soluble in a mixture of the near-critical fluid and the organic solvent.

Low to medium polarity compounds amenable to extraction by a process of the invention include, but are not limited to, lipids (such as fatty acids, fatty acid $C_1$-$C_4$ alcohol esters, fatty acid amines, fatty acid amides, alkoxyglycerol ethers, fatty alcohols, fat soluble vitamins, sterols, wax esters, carotenoids, hydrocarbons), oleoresins, essential oils, aglycone flavonoids, hyperforin, and polyphenolic antioxidants (such as carnosic acid, salvianolic acid and luteolin). This list is not exclusive, and is dependent on the near-critical fluid used. For example, if $CO_2$ is used, phospholipids will precipitate whereas if dimethyl ether is used, phospholipids will be extracted.

It will be appreciated that any medium polarity compounds that are not soluble in the near-critical fluid will co-precipitate with the water phase in the raffinate.

Highly polar and/or high molecular mass compounds that will precipitate in the raffinate are usually highly water soluble, and include, for example, proteins, amino acids, enzymes, simple sugars, carbohydrates, tannins, and urea.

While the invention is described, for the most part, with reference to the fractionation of solutions obtained by extracting plant material, it is to be appreciated that the fractionation of solutions obtained by extracting animal material equally forms part of this invention.

The extraction of plant material using hydro-alcoholic mixtures is well known in the art. The extraction yield and composition depends on the ratio of hydrophilic solvent to water in the solvent mixture, the ratio of solvent to solid material, extraction temperature, degree to which the plant material is comminuted, and the moisture content of the plant material prior to extraction. In general, the higher the ratio of hydrophilic solvent to water in the solvent, the greater the yield of low to medium polarity compounds. An increase in the water content of the solvent mixture results in an increase in the extraction of high polarity compounds, and a decrease in low polarity compounds. There is usually an optimum ratio of hydrophilic solvent to water to achieve an extract from plant materials with a broad spectrum of polarity. The solvent composition for ethanol/water mixtures is usually in the range 95% ethanol/5% water to 70% ethanol/30% water. The ratio of solvent to plant material is sufficient to ensure that the spent plant material can be separated from the solvent. Typical solvent to solids ratios are 2:1 to 20:1.

In one embodiment of the invention, supercritical $CO_2$ is introduced into an extraction vessel together with the aqueous-organic solution obtained from the extraction of a suitable plant material.

Preferably, the plant material is selected from those known to contain at least one desirable compound that is to be separated from other less desirable compounds, and more preferably, contains a plurality of desirable compounds of varying molecular mass and polarity that will be simultaneously extracted by the aqueous-organic solvent.

The plant material may include whole plants and/or parts thereof, including leaf, stem, flowers, seeds, roots, bark, heartwood, sap, or resin. The plants may be terrestrial or marine/fresh water derived, such as micro and macro-algae. The plant material can be extracted using the aqueous-organic solvent in a fresh, frozen or dried form. Preferably, the plant material is comminuted prior to extraction.

In another embodiment, supercritical $CO_2$ is used simultaneously as a solvent and an anti-solvent. When contacted with the aqueous-organic solution containing plant extracts, the $CO_2$ reduces the pH of the solution, and extracts the low to medium polarity plant extract constituents, and most of the ethanol. Ethanol acts as a co-solvent, which greatly increases the solubility of the plant extract constituents. Polar plant extract constituents and water are precipitated by the anti-solvent behaviour of supercritical $CO_2$ into the extraction vessel, and can be continuously removed as a liquid solution of polar plant constituents in water.

The $CO_2$ solution of low to medium polarity plant extract constituents is transferred to a suitable vessel where the pressure is reduced to the point where ethanol and plant extract constituents are precipitated into the vessel as a liquid stream.

Referring to FIG. 1, a phase diagram for the ternary system ethanol/water/$CO_2$ at various temperatures and pressures is shown. The region above the line at a given temperature and pressure is a single phase mixture, and below is two phases. The dashed line from the $CO_2$ axis to the phase line shows the preferred operating region to ensure sufficient $CO_2$ dissolves in the liquid phase to enable it to act as an anti-solvent (and cause precipitation), and sufficient ethanol dissolves in $CO_2$ so that it can act as a solvent and dissolve the organic solvent (ethanol) and compounds of medium polarity. A liquid phase exists to the right of the line, and a vapour phase to the left. The diagram shows that at a lower pressure of 68 bar, a vapour phase cannot be formed that dissolves significant quantities of ethanol to enable extraction. Moreover, as the pressure decreases further, insufficient $CO_2$ can dissolve in the liquid phase to cause precipitation of polar compounds. The lower pressure phase lines indicate the phases that could be expected during pressure reduction to recover medium and low polarity solutes and the organic solvent. Similar phase diagrams can be drawn for dimethyl ether, however the single phase region is substantially larger than that for $CO_2$ due to its higher mutual solubility with water.

The pressure reduction can be carried out in one step or multiple steps, to give more than one fraction of plant extract constituents. Plant extract constituents may then be recovered from the liquid stream(s) by evaporation of ethanol.

Generally, as the pressure is reduced, those plant extract constituents that are least soluble in the near-critical fluid will precipitate first. The most soluble plant extract constituents will precipitate last. Therefore it will be appreciated that a degree of separation or fractionation of the plant extract constituents from one another may be achieved. Additionally, the separation conditions can be chosen such that the majority of the ethanol precipitates last, and can thus be recycled for re-extraction of plant material.

The fractionation is related to molecular mass as well as polarity, as high molecular mass, low polarity compounds are less soluble than lower molecular mass compounds with low polarity; and medium polarity compounds of a similar molecular mass are less soluble than their corresponding low polarity compounds.

Alternatively, or in addition to fractionation by step-wise pressure reduction, the plant extract constituents may be further fractionated in a packed column.

Optionally, a high-pressure water wash step is introduced after the extraction step and before the pressure reduction steps to partially remove ethanol that is extracted by near-critical $CO_2$, and thus reduce the solubility of medium polarity compounds in the near critical fluid phase. These medium polarity compounds will then precipitate, giving rise to an additional fraction.

In a further embodiment, subcritical dimethyl ether is used simultaneously as a solvent and an anti-solvent. When contacted with the solution containing plant extracts, the dimethyl ether extracts the low to medium polarity plant extract constituents, all of the organic solvent, and some of the water.

The co-extracted organic solvent and water acts as a co-solvent, which greatly increases the solubility of the plant extract constituents. Polar plant extract constituents and the remaining water are precipitated by the anti-solvent behaviour of near-critical dimethyl ether into the extraction vessel, and can be continuously removed as a liquid solution of polar plant constituents in water.

The dimethyl ether solution of low to medium polarity plant extract constituents is transferred to a suitable vessel where the pressure is reduced to the point where dimethyl ether becomes a vapour, and organic solvent water and plant extract constituents are precipitated into the vessel as a liquid stream.

Alternatively, the temperature can be reduced at constant pressure, which substantially reduces the solubility of water in dimethyl ether. This results in the precipitation of medium polarity compounds.

As another alternative, the pressure can be partially reduced, with little or no temperature change, to the point where a three phase region exists for the system dimethyl ether/water.

Figure 2:
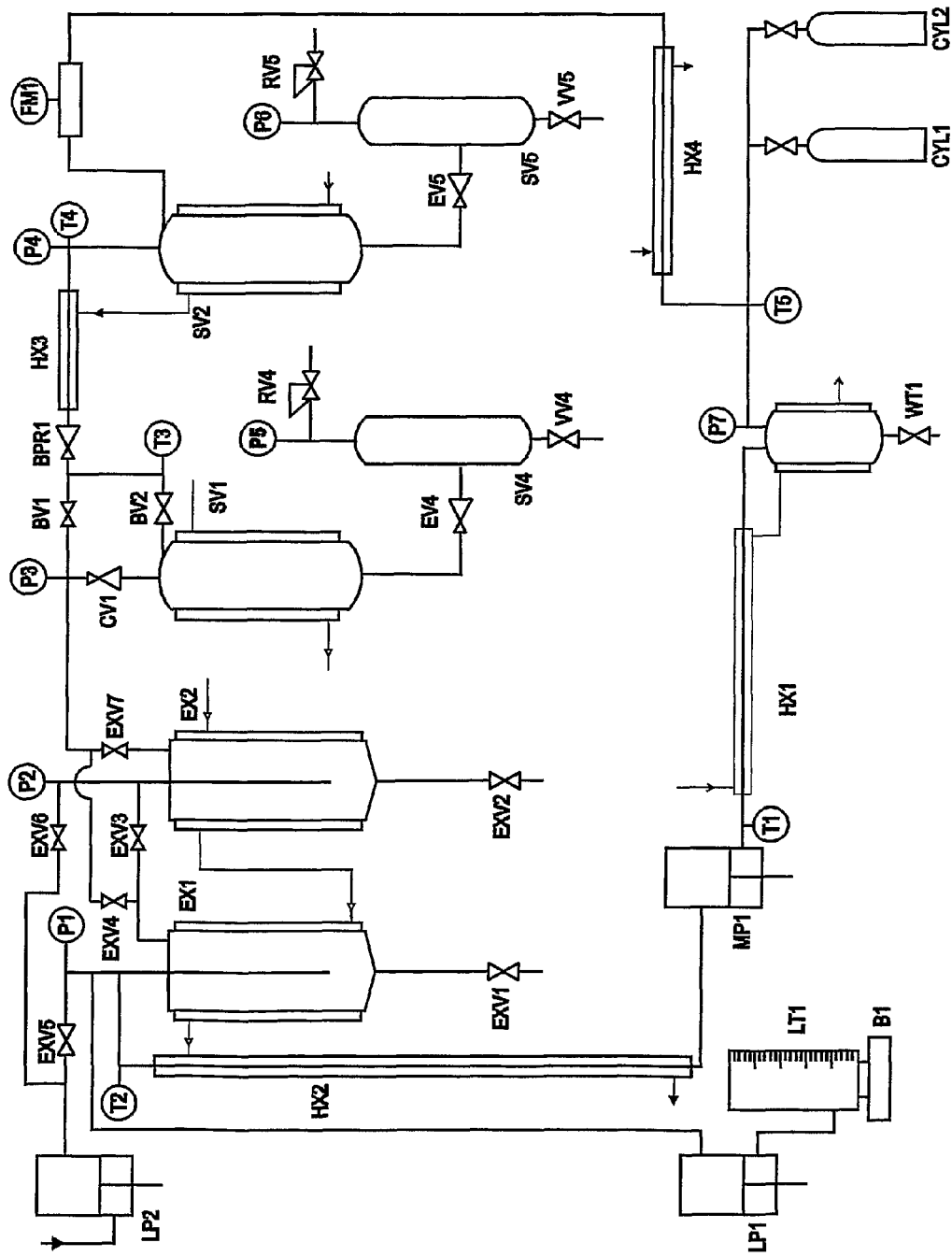
FIG. 2 shows a schematic representation of one embodiment of the process of the invention.

Referring now to FIG. 2, a schematic and non-limiting representation of equipment used in preferred embodiments of the process is shown. In a first embodiment, near-critical solvent is supplied to the apparatus by liquid supply cylinders CYL1 and CYL2. The near-critical solvent then passes through a chilled water trap WT1 and condenser/subcooler HX1 before being compressed to the operating pressure by a positive displacement pump MP1. The compressed near-critical solvent then passes through preheater heat exchanger HX2 and then into the first contacting vessel EX1 via a vertical downcorner tube which preferentially terminates in a static mixer. Simultaneously, aqueous-organic solution containing plant or animal extract is withdrawn from a supply tank and compressed to the operating pressure by piston pump LP1. The high pressure solution is then mixed with the near-critical solvent in a tee joint just prior to the downcorner tube that passes into EX1. Insoluble highly polar extract and water are precipitated and recovered from the base of EX1 via valve EXV1. A secondary separator can be used to recover near-critical solvent that flashes off (not shown). The remaining medium to low polarity extract and the bulk of the organic solvent are dissolved in the near-critical fluid and form a separate phase in the top of the vessel. This phase is continuously removed from the first contacting vessel via valve EXV4.

The combined near-critical rich solution then passes through a pressure reduction valve CV1, where the pressure is reduced sufficiently to cause at least precipitation of the medium polarity extract, and then into the first heated separation vessel SV1 (a heat exchanger can also be included after CV1 to improve heat transfer). The medium polarity extract and an amount of organic solvent is precipitated into this vessel. This extract can be continuously recovered by further depressurisation through valve EV4 to secondary extract recovery vessel SV4 and then through valve W4. Gas resulting from separation of gas from organic solvent can be recovered via valve RV3.

The bulk of the near-critical fluid and low polarity extract form a separate phase in the top of SV1. This phase is then passed through a back pressure regulator BPR1, where the pressure was reduced to cylinder pressure, before entering the second separation vessel SV2 via heat exchanger HX3. The remainder of the extract and organic solvent is precipitated into this vessel. This extract can be recovered continuously by further depressurisation through valve EV5 into vessel SV5 and then through valve W5. Gas resulting from separation of gas from organic solvent can be recovered via relief valve RV5. Alternatively, the recovery of low to medium polarity extract and organic solvent is carried out in a single separation stage, as is well known in the art. The bulk of the gas exits the top of SV2 and then passed through a coriolis mass flow meter FM1 and cooler heat exchanger HX4 before being recycled back to MP1 via the water trap WT1.

In a second embodiment of the process, the steps are identical as described for the first embodiment up until the near-critical phase present in the first contacting vessel EX1 exits this vessel. Here, the near-critical phase passes through valve EXV3 and into the second contacting vessel EX2, where it is contacted in a downcorner tube that terminates in a static mixer with water that is supplied via high pressure pump LP2. After the two streams have contacted each other, the aqueous phase containing some organic solvent and medium polarity plant or animal extract separates out as a lower phase from the upper near critical phase, and can be recovered via valve EXV2. The upper near critical phase is recovered via valve EXV7, and then the remaining low to medium polarity extract and organic solvent is recovered as described for the first embodiment.

In a further embodiment of the process, an aqueous phase containing a plurality of polar extracts resulting from application of the first embodiment of the process using supercritical $CO_2$ as the near-critical solvent, becomes the feedstock for a further application of the first embodiment of the process, but in which the near-critical solvent is now dimethyl ether.

In another embodiment of the process, an aqueous organic phase containing a plurality of medium or low to medium polar extracts resulting from application of the first embodiment of the process using dimethyl ether as the near-critical solvent, becomes the feedstock for a further application of the first embodiment of the process, but in which the near-critical solvent is now supercritical $CO_2$.

In yet a further embodiment of the process, additional organic solvent is supplied via pump LP2 and valve EXV5, which is then mixed with the aqueous organic solvent mixture and near-critical fluid according to the first embodiment.

EXAMPLES

Example 1

*Echinacea Purpurea* Aqueous-Organic Solution (Aerial Portions)

This example demonstrates a process for the separation of active components, phenolics and alkamides, from water/ethanol solutions, using a continuous anti-solvent/extraction process. A commercial hydroalcoholic (water/ethanol) solution obtained by the solvent extraction of the dried aerial portions of *Echinacea Purpurea* was used. The ethanol content of the hydroalcoholic solvent (extract-free basis) was 93%. The *Echinacea Purpurea* solution was contacted with supercritical $CO_2$ in the extraction vessel at 280 bar and 60° C. The raffinate fraction was recovered from the bottom of the extraction vessel at regular time intervals. The extract was recovered from a single separator operated at 30 bar and 60° C.

The ratio of feed liquid (*Echinacea* tops hydroalcoholic tincture) to solvent (supercritical $CO_2$) was varied over the range 0.012 to 0.25 to determine the effect on the degree of separation between alkamides (lipophilic compounds) that are extracted in the process and chichoric acid (hydrophilic compound) that is precipitated in the process.

Samples of raffinate and extract were analysed by a published HPLC method for phenolics, including chichoric acid (N. B. Perry, E. J. Burgess, and V. L Glennie, *J. Agri. Food Chem.*, 2001, 49, 1702-1706). For liquid samples containing solvent a sub sample (1 ml) was dried down and redissolved in 10 ml of ethanol/water (70%), shaken for 15 minutes and filtered through (0.45 μm filter), prior to analysis. For the solid samples, 125 mg of sample was shaken for 15 minutes with 25 ml ethanol/water (70%) and filtered through (0.45 μm filter). Samples of raffinate and extract were analyzed by HPLC for alkamides using a published method (N. B. Perry, J. W. van Klink, E. J. Burgess, and G. A Parmenter, *Planta Medica*, 1997, 66, 58-62). For liquid samples containing solvent a sub sample (1 ml) of the sample was dried (rotary evaporation, 35° C.) and then re-dissolved in water (0.2 ml). This solution was diluted with acetonitrile (1.8 ml) containing 0.1 mg/ml of N-phenylpentanamide as an internal standard. A sub sample (1 ml) of the resulting suspension was filtered through a C18 solid phase extraction column (Supelco, 3 ml, pre-wet with 9:1 acetonitrile/water), rinsed with a further 9:1 acetonitrile/water (2 ml). The combined eluates were filtered (0.45 μm) before HPLC analysis. The extraction of the solid samples varied slightly with the mass taken (0.5 g) dissolved in water (1 ml) and then taken up to 9 ml of HPLC grade acetonitrile containing 0.1 mg/ml of N-phenylpentanamide as an internal standard.

The results are shown in Table 1 for the raffinate and extract samples at specified solvent to $CO_2$ flow rate ratios. The raffinate samples were evaporated to dryness, so the total phenolics are directly related to the mass of the raffinate sample. The extract samples contain ethanol from the tincture and were analyzed without evaporation of the ethanol. This example shows that supercritical anti-solvent fractionation can separate the active alkamide components, which are concentrated in the extract, and the active phenolic components, which are concentrated in the raffinate. The example also shows that the ratio of solvent to feed has little influence on the separation efficiency for these two classes of compounds.

TABLE 1

Separation of chichoric acid from alkamides, *Echinacea* aerial portions

| Flow rate | Raffinate, g/kg | | Extract, mg/ml | |
| --- | --- | --- | --- | --- |
| ratio | Chichoric acid | Alkamides | Chichoric acid | Alkamides |
| 0.227 | 2.94 | 0.06 | 0.04 | 0.46 |
| 0.149 | 2.92 | 0.05 | 0.01 | 0.57 |
| 0.106 | 3.06 | <0.01 | 0.01 | 0.32 |
| 0.058 | 3.09 | 0.01 | 0.02 | 0.35 |
| 0.013 | 2.33 | <0.01 | 0.05 | 0.08 |

Example 2

*Echinacea Augustifolia* Aqueous-Organic Solution (Roots)

This example demonstrates a process for the separation of active components, phenolics and alkamides, from water/ethanol solutions, using a continuous anti-solvent/extraction process. A commercial hydroalcoholic (water/ethanol) solution obtained by the solvent extraction of the dried roots of *Echinacea Augustifolia* was used. The ethanol content of the hydroalcoholic solvent (extract-free basis) was 93%. The experimental method used and analysis methods were the same as that used in Example 1.

The results are shown in Table 2 for the raffinate and extract samples respectively at specified solvent solution to $CO_2$ ratios. This example shows that supercritical anti-solvent fractionation can separate the active alkamide components, which are concentrated in the in the extract, and the active phenolic components, which are concentrated in the raffinate. The example also shows that the ratio of solvent to feed has little influence on the separation efficiency for these two classes of compounds.

TABLE 2

Separation of chichoric acid from alkamides, *Echinacea* roots

| Flow rate | Raffinate, g/kg | | Extract, mg/ml | |
| --- | --- | --- | --- | --- |
| ratio | Chichoric acid | Alkamides | Chichoric acid | Alkamides |
| Feed | 2.16 | 9.67 | | |
| 0.204 | 2.06 | 0.38 | 0.03 | 0.93 |
| 0.149 | 2.23 | 0.26 | 0.01 | 4.86 |
| 0.109 | 2.17 | 0.41 | 0.01 | 5.34 |
| 0.103 | 2.04 | 0.55 | 0.01 | 5.33 |
| 0.059 | 2.17 | 0.72 | <0.01 | 6.20 |
| 0.013 | 2.04 | 0.56 | 0.01 | 5.02 |

Example 3

Sage Aqueous-Organic Solution

This example demonstrates the supercritical anti-solvent fractionation process for separating hydrophilic polyphenolics, lipophilic antioxidants, and flavour/aroma compounds into three separate fractions from water/ethanol solutions. The ethanol/water solutions were obtained by the solvent extraction of dried Dalmatian sage leaf. Extraction of dry Sage leaf was carried out in a stirred tank. Plant material was ground in a knife mill to a particle size of around 0.5-1 mm. Approximately 2 kg of plant material was added to the stirred tank and then solvent (70:30 ethanol:water mass ratio) was added until the plant material was submerged. The total ratio of solvent to solids was 3:1 (volume solvent/mass of solids). The tank was stirred for 3 hours at 40° C. The tincture was separated from the plant material by filtration under vacuum to give the feed solution. Analysis of the sage feed material, hydroalcoholic extract, and extracts and raffinates from anti-solvent fractionation were analyzed for essential oil marker components by GC, total phenols by colorimetric analysis, radical scavenging of 1,1-diphenyl-2-picrylhydrazyl (DPPH), polyphenolic content by HPLC, and lipophilic antioxidants by HPLC. Brief details on the analysis methods are given below.

GC Analysis of Sage Essential Oil. Dry raffinates or extracts were extracted with hexane and shaken in a heated water bath. The hexane soluble extracts were separated from the insoluble sage material by filtration, and then evaporated to dryness. GC analysis was carried out using a fused silica DB-5 column at 80 to 300° C. (7.5° C./min) and an FID detector (300° C.). Camphor and n-octadecane were used as external and internal standards.

Total phenol content. The total phenolic contents of Sage fractions were determined by a colorimetric method using the Folin-Ciocalteau reagent. Measurement was made as gallic acid equivalence by using various concentrations of gallic acid dissolved in acidified aqueous methanol.

Radical scavenging ability. 1,1-Diphenyl-2-picrylhydrazyl (DPPH) radical scavenging ability of the Sage fractions was determined by using freshly prepared 0.1 mM solution of DPPH in methanol. Solutions of raffinates or extracts were prepared in methanol to give a concentration of 1.0 mg/10 ml and 0.1 ml aliquots of these were added to 2.0 ml of the DPPH solution. For control 0.1 ml methanol was added to 2.0 ml of methanol. The mixture was shaken after each addition and left to stand for 1 hour. The absorbance of the samples was measured at 517 nm and the decrease in the absorbance compared to the control gave the value of the relative free scavenging activity of each sample.

Polyphenolics by HPLC. The sage extract and raffinate samples were extracted with 70% aqueous acetone three times. The three acetone extracts were combined, concentrated and freeze-dried. The combined acetone extract was fractionated on a HP20 column into water and methanol fractions and the glycosides were isolated from the water fraction by column chromatography on Sephadex and/or MC1 HP20 using water or aqueous methanol (up to 30% methanol). Fractions were collected using an automatic fraction collector and monitored by HPLC. The HPLC analyses were performed on a Hewlett Packard series 1100 equipped with a DAD detector (set at 280 and 350 nm) and a LiChrospher 100 RP-18 column held at 30° C. with the following solvent program: solvent A, 2% HOAc in $H_2O$; solvent B, 2% HOAc in $CH_3CN$; starting from 4% B up to 12% B in 20 mins, to 20% B in 30 mins and to 50% B in 45 mins. The flow rate was set to 1 ml/min.

Supercritical anti-solvent fractionation was carried out at three pressures at 313 K at a fixed ratio of $CO_2$ to solvent mixture, and at three ratios of $CO_2$ to solvent mixture at a fixed extraction pressure of 300 bar and extraction temperature of 313 K. The parameters and results from the fractionation trials are shown in Tables 3 and 4 for varying pressures and varying flow rates ratios respectively.

TABLE 3

Anti-solvent fractionation of sage aqueous-organic solution at 313 K and varying pressures at a flow rate ratio of 0.12 kg solution/kg $CO_2$

| Pressure bar | Fraction | % feed solids | Total phenols | Rosemarinic acid | Radical scaveng | Carnosic | Oil |
|---|---|---|---|---|---|---|---|
| 300 | Raffinate | 63.7 | 16.3 | 7.18 | 14.8 | N/D | N/D |
| | Sep 1 | 32.8 | 4.6 | 6.32 | | 30.2 | 8.3 |
| | Sep 2 | 3.5 | 1.1 | N/D | | | 91.9 |
| 270 | Raffinate | 70.3 | 16.3 | 8.8 | 15.5 | 0.4 | N/D |
| | Sep 1 | 25.2 | 5.4 | | | 32.2 | 5.5 |
| | Sep 2 | 4.5 | 2.1 | | | 13.3 | 90.4 |
| 220 | Raffinate | 72.1 | 18.5 | 8.5 | 14.5 | 0.5 | N/D |
| | Sep 1 | 23.5 | 5.2 | | | 34.4 | 5.5 |
| | Sep 2 | 4.4 | 1.6 | | | 10.7 | 84.1 |
| | Feed solution | 3.52 | 13.9 | 5.3 | | 8.3 | 2.1 |

All concentrations in % by mass dry solids basis

TABLE 4

Anti-solvent fractionation of sage aqueous-organic solution at 313 K, 300 bar and varying flow rate ratios of solution to $CO_2$

| Flow rate ratio | Fraction | % feed solids | Total phenols | Rosemarinic acid | Radical scaveng | Carnosic | Oil |
|---|---|---|---|---|---|---|---|
| 0.03 | Raffinate | 84.3 | 16.6 | 6.93 | | N/D | N/D |
| | Sep 1 | 10.6 | 13.4 | 3.54 | | 1.60 | 0.6 |
| | Sep 2 | 5.1 | 2.4 | N/D | | | 42.3 |
| 0.12 | Raffinate | 63.7 | 16.3 | 7.18 | 14.8 | N/D | N/D |
| | Sep 1 | 32.8 | 4.6 | 6.32 | | 30.2 | 8.3 |
| | Sep 2 | 3.5 | 1.1 | N/D | | | 91.9 |
| 0.27 | Raffinate | 74.5 | 16.2 | 6.96 | 13.7 | | |
| | Sep 1 | 23.5 | 3.0 | 0.14 | | 28.9 | 5.9 |
| | Sep 2 | 2.7 | 1.6 | 0.0 | | | 76.6 |
| | Feed solution | 3.52 | 13.9 | 5.3 | | 8.3 | 2.1 |

All concentrations in % by mass dry solids basis

This example shows that rosemarinic acids and other high molecular mass polyphenolics are concentrated in the raffinate fraction, lipophilic antioxidants carnosol, carnosic acid and methyl carnosate are concentrated in the first separator fraction, and volatile oil/oleoresin is concentrated in the second separator. The proportion of total feed solids recovered in each fraction is a function of pressure and flow rate ratio.

Example 4

Black Currant Aqueous Organic Solution

In this example, the fractionation of an ethanol-water extract of black currant pomace containing anthocyanins and flavonoids was carried out using either supercritical $CO_2$ or liquid dimethyl ether. Black currant pomace was freeze dried, and then extracted without crushing in a packed bed using a 70% ethanol: 30% water mixture. The solvent was continuously circulated through the bed of solids for 6 hours. The solvent was then drained from the solids and partially evaporated. The solids were then re-extracted a second time for six hours with 70% ethanol: 30% water mixture. The solvent was again drained from the solids, and partially evaporated. The two concentrates were combined, and then partially evaporated to a solids content of 28% by mass to minimise degradation during storage.

The aqueous-organic extract solution was separated into fractions by supercritical anti-solvent fractionation using $CO_2$. The concentrated solution of blackcurrant extract was diluted to 14% solids with 95% ethanol. Anti-solvent fractionation of blackcurrant pomace and solvent mixture was carried out with supercritical $CO_2$ at a pressure of 300 bar, temperature of 333 K and flow rate ratio (solvent mixture to $CO_2$) of 0.035. The solvent containing black currant pomace extract and $CO_2$ was mixed in a static mixer prior to precipitation in the extraction vessel. A red/purple coloured raffinate solution was continuously obtained from the extraction vessel by pressure reduction through a valve. Supercritical $CO_2$ and dissolved solvent and soluble extract then passed through two pressure reduction stages at pressures and temperatures of 90 bar and 328 K, and 52 bar and 313 K, respectively. The first separation stage yielded a red coloured solution, which was continuously recovered from the first stage separation vessel. The second separation stage yielded a light yellow/green coloured solution, which was mainly solvent. The anthocyanin and flavonoid concentrations in the feed solution, raffinate and extract fractions from the anti-solvent fractionation process are shown in Table 5, where a comparison is given against dimethyl ether.

The aqueous-organic extract solution was also separated into fractions by near-critical antisolvent fractionation using dimethyl ether. The concentrated solution of blackcurrant extract was diluted to 14% with water. Anti-solvent fractionation of blackcurrant pomace and solvent mixture was carried out with near-critical dimethyl ether at a pressure of 40 bar, temperature of 333 K and flow rate ratio (solvent mixture to dimethyl ether) of 0.096. The solvent containing black currant pomace extract and dimethyl ether was mixed in a static mixer prior to precipitation in the extraction vessel. A dark purple coloured raffinate solution was continuously obtained from the extraction vessel by pressure reduction through a valve. Dimethyl ether and dissolved solvent and soluble extract then passed through two pressure reduction stages at pressures and temperatures of 10 bar and 333 K, and 5-6 bar and 313 K, respectively. The first separation stage yielded a red coloured solution, which was continuously recovered from the first stage separation vessel. The second separation stage also yielded a red coloured solution, which was mainly solvent. The feed and antisolvent fraction anthocyanin and flavonoid concentrations are shown in Table 5, where a comparison is given against $CO_2$.

The concentrated aqueous organic extract solution was also separated into fractions by near-critical antisolvent fractionation using dimethyl ether without dilution. Anti-solvent fractionation of blackcurrant pomace and solvent mixture was carried out with near-critical dimethyl ether at a pressure of 40 bar, temperature of 333 K and flow rate ratio (solvent mixture to dimethyl ether) of 0.10. The solvent containing black currant pomace extract and dimethyl ether was mixed in a static mixer prior to precipitation in the extraction vessel. A dark purple coloured raffinate solution was continuously obtained from the extraction vessel by pressure reduction through a valve. Dimethyl ether and dissolved solvent and soluble extract then passed through two pressure reduction stages at pressures and temperatures of 10 bar and 333 K, and 5-6 bar and 313 K, respectively. The first separation stage yielded a red coloured solution, which was continuously recovered from the first stage separation vessel. The second separation stage also yielded a red coloured solution, which was mainly solvent. The feed and antisolvent fraction anthocyanin and flavonoid concentrations are also shown in Table 5.

TABLE 5

Anthocyanin and flavonoid concentration in anti-solvent fractions using either $CO_2$ or dimethyl ether

| Solvent | Feed solids | Fraction | Anthocyanins | Flavonoids | % feed solids |
| --- | --- | --- | --- | --- | --- |
| $CO_2$ | 28 | Feed solution | 9.0 | 1.59 | |
| | 14, diluted with ethanol | Raffinate | 9.4 | 1.51 | 81.2 |
| | | Extract 1 | 0.2 | 0.10 | 18.0 |
| | | Extract 2 | 0.0 | 0 | 0.8 |
| DME | 14, diluted with water | Raffinate | 21.9 | 1.10 | 4.3 |
| | | Extract 1 | 14.5 | 1.17 | 16.1 |
| | | Extract 2 | 5.5 | 1.69 | 79.4 |
| DME | 28 | Raffinate | 19.6 | 0.86 | 19.0 |
| | | Extract 1 | 8.4 | 1.62 | 13.8 |
| | | Extract 2 | 1.1 | 1.72 | 67.2 |

All concentrations in % by mass dry solids basis

This example shows that supercritical $CO_2$ is ineffective for concentrating anthocyanins and separating anthocyanins from (glycosylated) flavonoids, as both classes of compounds are almost insoluble in supercritical $CO_2$ and organic solvent. This example shows that liquid dimethyl ether can be used to produce fractions in which the anthocyanin concentration is substantially changed from the feed, and where some fractionation from flavonoids is also possible. The anthocyanin concentration in the raffinate is substantially increased, and the flavonoid concentration substantially decreased relative to the feed. This example also shows that the solvent composition of the aqueous-organic solution is important, as high water contents favoured almost complete extraction of flavonoids (79.4% of total solids in the second extract), whereas high ethanol contents enabled more selective fractionation.

Example 5

Olive Leaf Aqueous-Organic Solution

This example demonstrates how anti-solvent fractionation can be firstly carried out with supercritical $CO_2$ to produce a raffinate enriched in a desired fraction of plant extract, and then the raffinate can then be processed with near-critical dimethyl ether to further enrich the components in the desired fraction. Olive leaf was air dried, and ground to a fine powder. 6 kg of olive leaf powder was then extracted with 95% ethanol in a stirred tank at a solvent to solids ratio of 4 to 1 at a temperature of 313 K for 1 hour. The solution was then filtered, and the filtrate put aside. The residual solids were then re-extracted with 30% ethanol at a solvent to solids ratio of 4 to 1 at a temperature of 313 K for 1 hour. The solution was then filtered, and mixed with the filtrate from the first extraction. The mixed solution was then refrigerated to precipitate waxes before antisolvent processing with supercritical $CO_2$.

Anti-solvent fractionation of olive leaf extract and solvent mixture was carried out with supercritical $CO_2$ at a pressure of 300 bar, temperature of 333 K and flow rate ratio (solvent mixture to $CO_2$) of 0.04 to 0.19. The solvent containing olive leaf extract and $CO_2$ was mixed in a static mixer prior to precipitation in the extraction vessel. A brown coloured raffinate solution was continuously obtained from the extraction vessel by pressure reduction through a valve. Supercritical $CO_2$ and dissolved solvent and soluble extract then passed through two pressure reduction stages at pressures and temperatures of 100 bar, 60° C. and 57 bar, 43° C., respectively. The first separation stage yielded an intensely green coloured solution, which was continuously recovered from the first stage separation vessel. The second separation stage yielded a light yellow coloured solution, which was mainly ethanol. The raffinates and extract fractions were analyzed by HPLC for oleuropein and related compounds, flavanoids and vitamin E. The composition of each fraction, after evaporation to dryness, is shown in Table 6.

TABLE 6

Composition of raffinate and extracts from $CO_2$ anti-solvent fractionation of olive leaf

| Fraction | Flow ratio | Oleuropein | Oleuropein derivatives | Flavonoids | Vitamin E | % feed solids |
| --- | --- | --- | --- | --- | --- | --- |
| Olive leaf |  | 2.69 | 3.60 | 20.4 | 0 |  |
| Feed soln |  | 12.7 | 1.5 | 6.4 | 0.03 | 5.06 |
| Raffinate | 0.041 | 14.7 | 1.85 | 7.18 | 0 | 69.2 |
| 1st Extract |  | 2.34 | 0.24 | 1.09 | 0.10 | 30.2 |
| $2^{nd}$ Extract |  | 0.00 | 0.00 | 0.00 | 0.13 | 0.6 |
| Raffinate | 0.094 | 15.33 | 1.82 | 8.32 | 0.00 | 77.3 |
| $1^{st}$ extract |  | 1.66 | 0.18 | 0.72 | 0.17 | 21.6 |
| $2^{nd}$ Extract |  | 0.0 | 0.00 | 0.00 | 0.25 | 0.6 |
| Raffinate | 0.189 | 13.76 | 1.58 | 6.97 | 0.00 | 82.1 |
| $1^{st}$ extract |  | 0.60 | 0.00 | 0.15 | 0.30 | 17.8 |
| $2^{nd}$ Extract |  | 0.00 | 0.00 | 0.0 | 0.11 | 0.1 |

All concentrations in % by mass (dry solids basis)

The raffinates have enhanced concentrations of oleuropein, oleuropein derivatives, and flavonoids, and no vitamin E. The first extract is enhanced in chlorophyll and vitamin E, while the second extract is almost 100% solvent, which can be recycled for re-extraction of fresh plant material.

The collected raffinates from the $CO_2$ anti-solvent fractionation experiments were then further fractionated by anti-solvent fractionation using dimethyl ether. The anti-solvent fractionation of olive leaf extract and solvent was carried out with near critical dimethyl ether at a pressure of 40 bar, temperature of 333 K and flow rate ratio (solvent mixture to dimethyl ether) of 0.21. The solvent containing olive leaf extract and dimethyl ether was mixed in a static mixer prior to precipitation in the extraction vessel. A brown coloured raffinate solution was continuously obtained from the extraction vessel by pressure reduction through a valve. Near critical dimethyl ether and dissolved solvent and soluble extract then passed through a temperature reduction stage at fixed pressure (final temperature 20° C.) to give a first extract fraction, and then a pressure reduction stage (final pressure 6.6 bar) at a fixed temperature of 42° C. to give a second extract fraction. The first separation stage yielded a small amount of a dark brown extract, which was continuously recovered from the first stage separation vessel. The second separation stage yielded a light yellow/green coloured solution, which was mainly ethanol and the desired concentrate of oleuropein. The raffinates and extract fractions were analyzed by HPLC for oleuropein and related compounds, flavanoids, and vitamin E. The composition of each fraction, after removal of solvent, is shown in Table 7.

TABLE 7

Composition of raffinate and extracts from dimethyl ether anti-solvent fractionation of olive leaf

| Fraction | Flow ratio | Oleuropein | Oleuropein derivatives | Flavonoids | Vitamin E | % feed solids |
|---|---|---|---|---|---|---|
| Feed soln |  | 16.0 | 1.93 | 8.59 | 0.00 | 11.3 |
| Raffinate | 0.041 | 6.40 | 0.71 | 4.24 | 0.00 | 67.5 |
| 1st Extract |  | 8.61 | 0.98 | 4.42 | 0.00 | 2.4 |
| 2nd Extract |  | 23.98 | 3.00 | 12.06 | 0.00 | 30.1 |

The two step anti-solvent fractionation process has increased the concentration of oleuropein from 12.7% of the dissolved solids in the solvent extract, to 24.0% in the final product. This example also shows the difference in solvent power of the two solvents. Oleuropein is effectively insoluble in supercritical $CO_2$+ethanol, whereas it is highly soluble in the ternary mixture of dimethyl ether, ethanol and water.

Although the invention has been described by way of example, it should be appreciated that variations or modifications may be made without departing from the scope of the invention. Furthermore, when known equivalents exist to specific features, such equivalents are incorporated as if specifically referred to in the specification.

INDUSTRIAL APPLICABILITY

The process of the invention is useful for fractionating aqueous-organic solvent mixtures containing crude extracts obtained from plants or animal products, and for the recovery of various components of the extracts which may not be obtainable easily by other fractionation processes. The components of the extracts may be highly desirable, for example as food ingredients or medicines.

The invention claimed is:

1. A process for fractionating constituents of a solution that comprises a plurality of compounds selected from high, medium and low polarity constituents and that is obtained by extracting plant or animal material with an aqueous-organic solvent, the aqueous-organic solvent comprising a mixture of water and a water-miscible organic solvent, the process comprising:
   (a) contacting the solution with a near-critical fluid to produce (i) a raffinate phase containing high polarity constituents and water, and (ii) a near-critical fluid phase containing low to medium polarity constituents;
   (b) separating the near-critical fluid phase from the raffinate phase; and
   (c) recovering the low to medium polarity constituents from the near-critical fluid phase.

2. The process of claim 1 further comprising recovering the high polarity constituents from the raffinate phase.

3. The process of claim 1 wherein the near-critical fluid is selected from the group consisting of (i) supercritical $CO_2$, (ii) liquid $CO_2$, (iii) ethane, (iv) ethylene, (v) propane, (vi) propylene, (vii) butane, (viii) fluorinated $C_2$-$C_3$ hydrocarbons, (ix) nitrous oxide, (x) sulfur hexafluoride, (xi) dimethylether, (xii) partially and fully fluorinated analogues of dimethylether, and (xiii) a mixture of any two or more thereof of (i)-(xii).

4. The process of claim 3 wherein the near-critical fluid is selected from the group consisting of supercritical $CO_2$, liquid $CO_2$, and dimethylether.

5. The process of claim 4 wherein the near-critical fluid is supercritical $CO_2$ or liquid $CO_2$.

6. The process of claim 4 wherein the near-critical fluid is dimethylether.

7. The process of claim 1 wherein the water-miscible organic solvent is a $C_1$-$C_4$ alcohol.

8. The process of claim 7 wherein the $C_1$-$C_4$ alcohol is ethanol.

9. The process of claim 8 wherein the aqueous-organic solvent contains between 50% and 99% ethanol by volume when the near-critical fluid is supercritical $CO_2$.

10. The process of claim 9 wherein the aqueous-organic solvent contains between 70 and 99% ethanol by volume.

11. The process of claim 8 wherein the aqueous-organic solvent contains between 0 and 70% ethanol by volume when the near-critical fluid is dimethyl ether.

12. The process of claim 11 wherein the aqueous-organic solvent contains between 0 and 50% ethanol by volume.

13. The process of claim 1 wherein the water-miscible organic solvent is selected from the group consisting of a $C_3$-$C_5$ ketone, a $C_1$-$C_4$ carboxylic acid, and dimethylsulfoxide.

14. The process of claim 1 wherein the low to medium polarity constituents are recovered from the near-critical fluid phase by at least one of (i) reducing pressure of the near-critical phase, and (ii) heating the near-critical fluid phase.

15. The process of claim 14 wherein the pressure is reduced in two or more steps to recover the low to medium polarity constituents in two or more fractions.

16. The process of claim 1 wherein the process is carried out as a continuous process of removal of the raffinate phase and the near-critical fluid phase from a vessel without reducing the pressure of the vessel.

17. A process for fractionating constituents of a solution that comprises a plurality of compounds selected from high, medium and low polarity constituents and that is obtained by extracting plant or animal material with an aqueous-organic solvent, the aqueous-organic solvent comprising a mixture of water and a water-miscible organic solvent, the process comprising:
   (a) contacting the solution with a near-critical fluid to produce (i) a first raffinate phase containing high polarity constituents and water, and (ii) a first near-critical fluid phase containing low to medium polarity constituents;
   (b) separating the first near-critical fluid phase from the first raffinate phase;
   (c) contacting the first near-critical fluid phase with an aqueous phase to produce (i) a second raffinate phase containing medium polarity constituents and (ii) a second near-critical fluid phase containing low to medium polarity constituents;
   (d) separating the second near-critical fluid phase from the second raffinate phase; and
   (e) recovering the low to medium polarity constituents from the second near-critical fluid phase.

18. The process of claim 17 further comprising recovering the high polarity constituents from the first raffinate phase.

19. The process of claim 18 wherein the near-critical fluid is selected from the group consisting of (i) supercritical $CO_2$, (ii) liquid $CO_2$, (iii) ethane, (iv) ethylene, (v) propane, (vi) propylene, (vii) butane, (viii) fluorinated $C_2$-$C_3$ hydrocarbons, (ix) nitrous oxide, (x) sulfur hexafluoride, (xi) dimethylether, (xii) partially and fully fluorinated analogues of dimethylether, and (xiii) a mixture of any two or more of (i)-(xii).

20. The process of claim 19 wherein the near-critical fluid is selected from the group consisting of supercritical $CO_2$, liquid $CO_2$, and dimethylether.

21. The process of claim 20 wherein the near-critical fluid is supercritical $CO_2$ or liquid $CO_2$.

22. The process of claim 20 wherein the near-critical fluid is dimethylether.

23. The process of claim 17 wherein the water-miscible organic solvent is a $C_1$-$C_4$ alcohol.

24. The process of claim 23 wherein the $C_1$-$C_4$ alcohol is ethanol.

25. The process of claim 24 wherein the aqueous-organic solvent contains between 50% and 99% ethanol by volume when the near-critical fluid is supercritical $CO_2$.

26. The process of claim 25 wherein the aqueous-organic solvent contains between 70 and 99% ethanol by volume.

27. The process of claim 24 wherein the aqueous-organic solvent contains between 0 and 70% ethanol by volume when the near-critical fluid is dimethyl ether.

28. The process of claim 27 wherein the aqueous-organic solvent contains between 0 and 50% ethanol by volume.

29. The process of claim 17 wherein the water-miscible organic solvent is selected from the group consisting of a $C_3$-$C_5$ ketone, a $C_1$-$C_4$ carboxylic acid, and dimethylsulfoxide.

30. The process of claim 17 wherein the low to medium polarity constituents are recovered from the second near-critical fluid phase by at least one of (i) reducing pressure of the second near-critical phase, and (ii) heating the second near-critical fluid phase.

31. The process of claim 30 wherein the pressure is reduced in two or more steps to recover the low to medium polarity constituents in two or more fractions.

32. The process of claim 17 wherein the process is carried out as a continuous process of removal of the second raffinate phase and the second near-critical fluid phase from a vessel without reducing the pressure of the vessel.

33. A process for fractionating constituents of a solution that comprises a plurality of compounds selected from high, medium or low polarity constituents and that is obtained by extracting plant or animal material with an aqueous-organic solvent, the aqueous-organic solvent comprising a mixture of water and a water-miscible organic solvent, the process comprising:
(a) contacting the solution with a first near-critical fluid to produce (i) a first raffinate phase containing high polarity constituents and water, and (ii) a first near-critical fluid phase;
(b) separating the first near-critical fluid phase from the first raffinate phase;
(c) contacting the first raffinate phase with a second near-critical fluid to produce (i) a second raffinate phase containing high polarity constituents and water, and (ii) a second near-critical fluid phase containing medium polarity constituents;
(d) separating the second near-critical fluid phase from the second raffinate phase; and
(e) recovering the medium polarity constituents from the second near-critical fluid phase.

34. The process of claim 33 wherein the first and second near-critical fluids are independently selected from the group consisting of (i) supercritical $CO_2$, (ii) liquid $CO_2$, (iii) ethane, (iv) ethylene, (v) propane, (vi) propylene, (vii) butane, (viii) fluorinated $C_2$-$C_3$ hydrocarbons, (ix) nitrous oxide, (x) sulfur hexafluoride, (xi) dimethylether, (xii) partially and fully fluorinated analogues of dimethylether, and (xiii) a mixture of any two or more of (i)-(xii).

35. The process of claim 33 wherein the first near-critical fluid has a lower solvent power for high polarity compounds than the second near-critical fluid.

36. The process of claim 33 wherein (i) the first near-critical fluid is liquid or supercritical $CO_2$—, and (ii) the second near-critical fluid is liquid dimethyl ether.

37. A process for fractionating constituents of a solution that comprises a plurality of compounds selected from high, medium and low polarity constituents and that is obtained by extracting plant or animal material with an aqueous-organic solvent, the aqueous-organic solvent comprising a mixture of water and a water-miscible organic solvent, the process comprising:
(a) contacting the solution with a first near-critical fluid to produce (i) a first raffinate phase containing high polarity constituents and water, and (ii) a first near-critical fluid phase;
(b) separating the first near-critical fluid phase from the first raffinate phase;
(c) contacting the first raffinate phase with a second near-critical fluid to produce (i) a second raffinate phase containing high polarity constituents and water, and (ii) a second near-critical fluid phase containing medium polarity constituents;
(d) separating the second near-critical fluid phase from the second raffinate phase;
(e) contacting the second near-critical fluid phase with an aqueous phase to produce (i) a third raffinate phase containing third raffinate phase medium polarity constituents and (ii) a third near-critical fluid phase containing third near-critical fluid phase medium polarity constituents;
(f) separating the third near-critical fluid phase from the third raffinate phase; and
(g) recovering the third near-critical fluid phase medium polarity constituents from the third near-critical fluid phase.

38. The process of claim 37 wherein the first and second near-critical fluids are independently selected from the group consisting of (i) supercritical $CO_2$, (ii) liquid $CO_2$, (iii) ethane, (iv) ethylene, (v) propane, (vi) propylene, (vii) butane, (viii) fluorinated $C_2$-$C_3$ hydrocarbons, (ix) nitrous oxide, (x) sulfur hexafluoride, (xi) dimethylether, (xii) partially and fully fluorinated analogues of dimethylether, (xiii) a mixture of any two or more of (i)-(xii).

39. The process of claim 37 wherein the first near-critical fluid has a lower solvent power for high polarity compounds than the second near-critical fluid.

40. The process of claim 37 wherein (i) the first near-critical fluid is liquid $CO_2$ or supercritical $CO_2$ and (ii) the second near-critical fluid is liquid dimethyl ether.

41. A process for fractionating constituents of a first solution that comprises a plurality of compounds selected from high, medium and low polarity constituents and that is obtained by extracting plant or animal material with an aqueous-organic solvent, the aqueous-organic solvent comprising a mixture of water and a water-miscible organic solvent, the process comprising:

(a) contacting the first solution with a first near-critical fluid to produce (i) a first raffinate phase containing high polarity constituents and water, and (ii) a first near-critical fluid phase containing low to medium polarity constituents;

(b) separating the first near-critical fluid phase from the first raffinate phase;

(c) recovering the low to medium polarity constituents and organic solvent from the first near-critical fluid phase to obtain a second solution;

(d) contacting the second solution with a second near-critical fluid to produce a second raffinate phase containing medium polarity constituents and a second near-critical fluid phase containing low polarity constituents;

(e) separating the second near-critical fluid phase from the second raffinate phase;

(f) recovering the medium polarity constituents from the second raffinate phase; and (g) recovering the low polarity constituents from the second near-critical fluid phase.

42. The process of claim 41 wherein the first and second near-critical fluids are independently selected from the group consisting of (i) supercritical $CO_2$, (ii) liquid $CO_2$, (iii) ethane, (iv) ethylene, (v) propane, (vi) propylene, (vii) butane, (viii) fluorinated $C_2$-$C_3$ hydrocarbons, (ix) nitrous oxide, (x) sulfur hexafluoride, (xi) dimethylether, (xii) partially and fully fluorinated analogues of dimethylether, and (xiii) a mixture of any two or more of (i)-(xii).

43. The process of claim 42 wherein the first near-critical fluid has a higher solvent power for high polarity compounds than the second near-critical fluid.

44. The process of claim 42 wherein the first near-critical fluid is liquid dimethyl ether and the second near-critical fluid is liquid $CO_2$ or supercritical $CO_2$.

* * * * *